No. 717,535. PATENTED JAN. 6, 1903.
J. W. BRAY.
ACETYLENE BURNER.
APPLICATION FILED MAY 27, 1902.
NO MODEL.
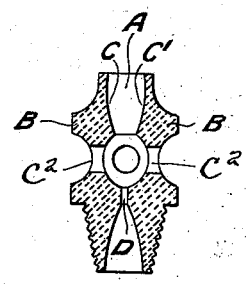
WITNESSES
INVENTOR
John William Bray.
By Richardson
ATTORNEYS

UNITED STATES PATENT OFFICE.

JOHN W. BRAY, OF LEEDS, ENGLAND.

ACETYLENE-BURNER.

SPECIFICATION forming part of Letters Patent No. 717,535, dated January 6, 1903.

Application filed May 27, 1902. Serial No. 109,187. (No model.)

*To all whom it may concern:*

Be it known that I, JOHN WILLIAM BRAY, a subject of the King of Great Britain and Ireland, whose postal address is Bagby Works, Leicester Place, Leeds, in the county of York, England, have invented certain new and useful Improvements in Acetylene-Burners, (for which application for Letters Patent has been made in Great Britain, numbered 11,131, dated May 15, 1902,) of which the following is a specification.

This invention relates to certain improvements in acetylene-burners, and has for its object the prevention of the "lighting back" and the consequent fouling of the burner thereby when the gas issuing from the nipple is ignited.

In describing my invention in detail reference is made to the accompanying sheet of drawing, in which the figure represents a sectional elevation of my improved burner drawn to an enlarged scale.

In carrying out my invention I accomplish my object by forming the final aperture A of burner B of conical form, as shown at C and C', flaring outwardly, and by so doing the gas-flame is less liable to "light back" from the point of ignition to the small gas-jet aperture D, and the said aperture D is thus maintained in a cleaner state than hitherto.

As shown in the drawing, the interior walls of the discharge-opening are of convex form, as shown at C C'. The air-inlets $C^2$ are at the apex of the conical discharge-mouth and extend through the walls of the burner.

What I claim as my invention is—

1. A burner B for acetylene gas, having the final aperture A of conical form, the sides of the cone being convex, substantially as described.

2. An acetylene-gas burner having its final outlet of conical form flaring outwardly and air-inlet openings at the apex of the cone and through the wall of the burner, substantially as described.

In witness whereof I have hereunto set my hand in the presence of two witnesses.

JOHN W. BRAY.

Witnesses:
CHAS. PAWSON,
CLIVE WAUGH.